United States Patent
Hayano et al.

(10) Patent No.: US 10,538,619 B2
(45) Date of Patent: Jan. 21, 2020

(54) HYDROGENATED SYNDIOTACTIC NORBORNENE-BASED RING-OPENING POLYMER

(71) Applicant: ZEON CORPORATION, Tokyo (JP)

(72) Inventors: Shigetaka Hayano, Tokyo (JP); Richard Royce Schrock, Cambridge, MA (US); Benjamin Autenrieth, Cambridge, MA (US)

(73) Assignee: ZEON CORPORATION, Tokyo (JP)

( * ) Notice: Subject to any disclaimer, the term of this patent is extended or adjusted under 35 U.S.C. 154(b) by 383 days.

(21) Appl. No.: 15/063,798

(22) Filed: Mar. 8, 2016

(65) Prior Publication Data

US 2016/0264721 A1   Sep. 15, 2016

Related U.S. Application Data

(60) Provisional application No. 62/130,163, filed on Mar. 9, 2015.

(51) Int. Cl.
| | | |
|---|---|---|
| *C08G 61/02* | (2006.01) | |
| *C08G 61/08* | (2006.01) | |
| *B01J 31/20* | (2006.01) | |
| *B01J 31/22* | (2006.01) | |
| *B01J 31/24* | (2006.01) | |

(52) U.S. Cl.
CPC ............ *C08G 61/08* (2013.01); *B01J 31/20* (2013.01); *B01J 31/2239* (2013.01); *B01J 31/2265* (2013.01); *B01J 31/2404* (2013.01); *B01J 2231/543* (2013.01); *B01J 2231/645* (2013.01); *B01J 2531/66* (2013.01); *B01J 2531/821* (2013.01); *C08G 2261/12* (2013.01); *C08G 2261/212* (2013.01); *C08G 2261/3324* (2013.01); *C08G 2261/3325* (2013.01); *C08G 2261/3327* (2013.01); *C08G 2261/418* (2013.01); *C08G 2261/724* (2013.01)

(58) Field of Classification Search
CPC ............ C08G 61/02; C08G 2261/3327; C08G 2261/3324; C08G 2261/12; C08G 2261/3325
USPC .......................................................... 526/308
See application file for complete search history.

(56) References Cited

U.S. PATENT DOCUMENTS

| | | | |
|---|---|---|---|
| 2013/0116434 A1 | 5/2013 | Schrock et al. | |
| 2016/0032094 A1* | 2/2016 | Miyazawa | C08K 7/14 |
| | | | 524/526 |
| 2016/0137794 A1* | 5/2016 | Yamada | B29C 55/06 |
| | | | 525/332.1 |

FOREIGN PATENT DOCUMENTS

| | | | |
|---|---|---|---|
| JP | 2005089744 A | | 4/2005 |
| JP | 2006-052333 A | * | 2/2006 |
| JP | 2007-16102 A | | 1/2007 |
| JP | 2007-23202 A | | 2/2007 |
| JP | 2007137935 A | | 6/2007 |
| JP | 2014-162811 A | | 9/2014 |
| JP | 2014-534234 A | | 12/2014 |
| JP | 2015163682 A | | 9/2015 |

OTHER PUBLICATIONS

Flook et al. Organometallics 2012, 31, 6231-6243 (Year: 2012).*
Hayano et al. Macromolecules 47, 7797-7811 (Year: 2014).*
Written Opinion dated Jun. 21, 2016 issued in counterpart International Application No. PCT/JP2016/058417. (4 pages).
Bishop, John P. et al., "The Crystal-Crystal Transition in Hydrogenated Ring-Opened Polynorbornenes: Tacticity, Crystal Thickening, and Alignment", Journal of Polymer Science Part B: Polymer Physics, vol. 49, No. 1, Sep. 2, 2011 pp. 68-79; Cited in European Search Report dated Oct. 24, 2018.
Autenrieth, Benjamin et al., "Stereospecific Ring-Opening Metathesis Polymerization (ROMP) of Norbornene and Tetracyclododecene by Mo and W Initiators", Macromolecules, vol. 48, No. 8, Apr. 28, 2015, pp. 2493-2503; Cited in European Search Report dated Oct. 24, 2018.
Extended (supplementary) European Search Report dated Oct. 24, 2018, issued in counterpart European Application No. 16 76 1876 (9 pages).

* cited by examiner

*Primary Examiner* — Mark S Kaucher
(74) *Attorney, Agent, or Firm* — Westerman, Hattori, Daniels & Adrian, LLP

(57) ABSTRACT

A hydrogenated norbornene-based ring-opening polymer having a syndiotacticity ((racemo diads)/(meso diads+racemo diads)×100) of more than 90% is disclosed. A method for producing the same is also disclosed. It is thus possible to provide a hydrogenated highly syndiotactic norbornene-based ring-opening polymer that is formed of a single material, and exhibits high solvent resistance, and a method for producing the same.

2 Claims, No Drawings

HYDROGENATED SYNDIOTACTIC NORBORNENE-BASED RING-OPENING POLYMER

TECHNICAL FIELD

The present invention relates to a hydrogenated highly syndiotactic norbornene-based ring-opening polymer that exhibits excellent solvent resistance, and a method for producing a hydrogenated highly syndiotactic norbornene-based ring-opening polymer that includes producing a highly syndiotactic norbornene-based ring-opening polymer using a carbene complex, and hydrogenating the highly syndiotactic norbornene-based ring-opening polymer.

BACKGROUND ART

A hydrogenated ring-opening polymer of a norbornene-based monomer is one type of cycloolefin polymer that exhibits excellent transparency, low birefringence, excellent moldability, and the like, and has been used as a material that can be applied to various applications such as optical applications.

A hydrogenated ring-opening polymer of a norbornene-based monomer is normally obtained as an amorphous polymer having an atactic structure. However, a hydrogenated ring-opening polymer of a norbornene-based monomer that has an atactic structure may exhibit insufficient solvent resistance and the like depending on the application. In order to improve the performance of a hydrogenated ring-opening polymer of a norbornene-based monomer, it has been proposed to provide a hydrogenated ring-opening polymer of a norbornene-based monomer with solvent resistance by producing a hydrogenated ring-opening polymer of a norbornene-based monomer that has tactic structure.

For example, Patent Document 1 discloses that a hydrogenated amorphous norbornene-based ring-opening polymer is provided with solvent crack resistance by mixing a hydrogenated crystalline dicyclopentadiene ring-opening polymer with a hydrogenated amorphous norbornene-based ring-opening polymer. Patent Document 2 discloses that a copolymer that includes a hydrogenated crystalline dicyclopentadiene ring-opening polymer segment and a hydrogenated amorphous norbornene-based ring-opening polymer segment exhibits solvent crack resistance.

RELATED-ART DOCUMENT

Patent Document

Patent Document 1: JP-A-2007-016102
Patent Document 2: JP-A-2007-023202

SUMMARY OF THE INVENTION

Technical Problem

The inventor of the invention conducted studies regarding the compositions disclosed in Patent Documents 1 and 2, and found that it is difficult to produce a composition that includes a hydrogenated amorphous norbornene-based ring-opening polymer and a hydrogenated crystalline dicyclopentadiene ring-opening polymer on an industrial scale since it is necessary to mix two types of resins. Therefore, it has been desired to develop technology that can more easily provide a hydrogenated norbornene-based ring-opening polymer with solvent resistance.

In view of the above situation, an object of the invention is to provide a hydrogenated highly syndiotactic norbornene-based ring-opening polymer that is formed of a single material, and exhibits high solvent resistance.

Solution to Problem

The inventor conducted extensive studies in order to achieve the above object. As a result, the inventor found that a hydrogenated highly syndiotactic norbornene-based ring-opening polymer that has very high syndiotacticity, and exhibits excellent solvent resistance can be obtained by subjecting a norbornene-based monomer to ring-opening polymerization using a polymerization catalyst that includes a Group 6 transition metal compound having a specific structure, and hydrogenating the resulting norbornene-based ring-opening polymer to hydrogenate the carbon-carbon double bonds included in the norbornene-based ring-opening polymer. This finding has led to the completion of the invention.

Several aspects of the invention provide the following hydrogenated highly syndiotactic norbornene-based ring-opening polymer (see (1) to (3)), and method for producing a hydrogenated syndiotactic norbornene-based ring-opening polymer (see (4)).

(1) A hydrogenated norbornene-based ring-opening polymer having a syndiotacticity ((racemo diads)/(meso diads+racemo diads)×100) of more than 90%.

(2) The hydrogenated norbornene-based ring-opening polymer according to (1), having a syndiotacticity ((racemo diads)/(meso diads+racemo diads)×100) of more than 95%.

(3) The hydrogenated norbornene-based ring-opening polymer according to (1) or (2), having a syndiotacticity ((racemo diads)/(meso diads+racemo diads)×100) of more than 99%.

(4) A method for producing a hydrogenated syndiotactic norbornene-based ring-opening polymer including subjecting a norbornene-based monomer to ring-opening polymerization using a polymerization catalyst that includes a Group 6 transition metal compound represented by the following formula (1), and hydrogenating a norbornene-based ring-opening polymer obtained by the ring-opening polymerization to hydrogenate carbon-carbon double bonds included in the norbornene-based ring-opening polymer,

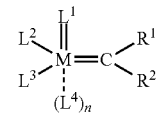

(1)

wherein M is an atom selected from the Group 6 transition metal atoms in the periodic table, $R^1$ and $R^2$ are independently a hydrogen atom or a group selected from a substituted or unsubstituted alkyl group having 1 to 12 carbon atoms, a substituted or unsubstituted cycloalkyl group having 3 to 20 carbon atoms, and a substituted or unsubstituted aryl group having 6 to 12 carbon atoms, $L^1$ is an oxygen atom, or a nitrogen atom that is unsubstituted, or substituted with a substituent selected from a substituted or unsubstituted alkyl group having 1 to 12 carbon atoms, a substituted or unsubstituted cycloalkyl group having 3 to 20 carbon atoms and a substituted or unsubstituted aryl group having 6 to 12 carbon atoms, $L^2$ and $L^3$ are independently a substituted or unsubstituted 5 to 15-membered conjugated heterocyclic group that includes at least one nitrogen atom, or a group represented by O—R³, R³ is a group selected from a substituted or unsubstituted alkyl group having 1 to 12 carbon atoms, a substituted or unsubstituted cycloalkyl group having 3 to 20 carbon atoms, and a substituted or unsubstituted aryl group having 6 to 30 carbon atoms, L⁴ is a phosphorus-containing compound, an oxygen-containing compound, or a nitrogen-containing compound, and n is 0 or 1.

Note that the expression "substituted or unsubstituted" used herein in connection with a group or the like means that the group or the like is unsubstituted, or substituted with a substituent.

Advantageous Effects of the Invention

The aspects of the invention thus provide a hydrogenated syndiotactic norbornene-based ring-opening polymer that has a syndiotacticity of more than 90%, and exhibits excellent solvent resistance.

DESCRIPTION OF EMBODIMENTS

A hydrogenated syndiotactic norbornene-based ring-opening polymer according to one embodiment of the invention is a polymer that has a syndiotacticity ((racemo diads)/(meso diads+racemo diads)×100) of more than 90%, and exhibits excellent solvent resistance. A method for producing a hydrogenated syndiotactic norbornene-based ring-opening polymer according to one embodiment of the invention includes subjecting a norbornene-based monomer to ring-opening polymerization using a polymerization catalyst that includes a Group 6 transition metal compound represented by the formula (1), and hydrogenating the resulting norbornene-based ring-opening polymer to hydrogenate the carbon-carbon double bonds included in the norbornene-based ring-opening polymer.

The hydrogenated norbornene-based ring-opening polymer according to one embodiment of the invention includes a hydrogenated poly(norbornene) repeating unit represented by the following formula (2).

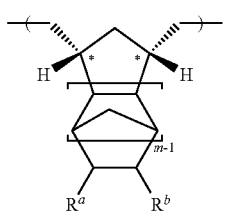

(2)

wherein m is 1 or 2, and $R^a$ and $R^b$ are independently a hydrogen atom or a group selected from a substituted or unsubstituted alkyl group having 1 to 12 carbon atoms, a substituted or unsubstituted cycloalkyl group having 3 to 20 carbon atoms, and a substituted or unsubstituted aryl group having 6 to 12 carbon atoms.

The hydrogenated syndiotactic norbornene-based ring-opening polymer according to one embodiment of the invention has tacticity since the carbon atoms indicated by "*" in the formula (2) are asymmetric carbon atoms. The hydrogenated norbornene-based ring-opening polymer according to one embodiment of the invention is a hydrogenated syndiotactic norbornene-based ring-opening polymer that has high syndiotacticity, wherein the ratio of racemo diads is more than 90%. It is preferable that the ratio of racemo diads is more than 90%, more preferably more than 95%, and particularly preferably more than 99%. If the ratio of racemo diads is 90% or less, the extension of the molecular chain of the hydrogenated norbornene-based ring-opening polymer (in a bulk state) in a solvent may change to a large extent, and the solvent molecules may easily enter the molecular chain, whereby the solvent resistance may be impaired.

The syndiotacticity may be calculated by "(racemo diads)/(meso diads+racemo diads)×100". The ratio of racemo diads may be calculated by analyzing the ¹³C-NMR spectrum of the hydrogenated norbornene-based ring-opening polymer. For example, the ratio of racemo diads may be determined by subjecting the hydrogenated norbornene ring-opening polymer to ¹³C-NMR spectrum analysis at 60° C. using chloroform-d as a solvent to quantitatively determine the spectrum of the methylene carbon atom of the 5-membered ring. Specifically, the ratio of racemo diads to meso diads may be determined based on the intensity ratio of the signal at 31.787 ppm attributed to meso diads to the signal at 31.799 ppm attributed to racemo diads. For example, the ratio of racemo diads to meso diads may be determined by subjecting the hydrogenated tetracyclododecene ring-opening polymer to ¹³C-NMR spectrum measurement at 200° C. using an o-dichlorobenzene-d4/trichlorobenzene (½ wt/wt) mixed solvent, and the ratio of racemo diads to meso diads may be determined based on the intensity ratio of the signal at 51.63 ppm attributed to meso diads to the signal at 51.72 ppm attributed to racemo diads (with respect to the methine carbon atom of the non-main chain of the 5-membered ring).

A norbornene-based monomer represented by the following formula (3) is used in connection with the embodiments of the invention.

(3)

wherein m is 1 or 2, and $R^a$ and $R^b$ are independently a hydrogen atom or a group selected from a substituted or unsubstituted alkyl group having 1 to 12 carbon atoms, a substituted or unsubstituted cycloalkyl group having 3 to 20 carbon atoms, a substituted or unsubstituted aryl group having 6 to 12 carbon atoms.

The substituted or unsubstituted alkyl group having 1 to 12 carbon atoms that may be represented by $R^a$ and $R^b$ may be linear, branched, or cyclic, but is preferably without heteroatom. Specific examples of the alkyl group having 1 to 12 carbon atoms that is either substituted or unsubstituted include a methyl group, an ethyl group, a propyl group, an isopropyl group, a butyl group, a t-butyl group, a pentyl group, a hexyl group, and the like.

A substituent that may substitute the alkyl group having 1 to 12 carbon atoms is not particularly limited. Examples of the substituent include substituted or unsubstituted aryl groups having 6 to 12 carbon atoms, such as a phenyl group, a 4-methylphenyl group, a 2,4-dimethylphenyl group, a 2-chlorophenyl group, and a 3-methoxyphenyl group; alkoxy groups having 1 to 12 carbon atoms, such as a methoxy group, an ethoxy group, and an isopropoxy group; haloalkyl groups having 1 to 12 carbon atoms, such as a trifluoromethyl group; haloalkoxy groups having 1 to 12 carbon atoms, such as a trifluoromethoxy group; an amino group; monosubstituted amino groups such as a methylamino group; disubstituted amino groups such as a dimethylamino group; an imino group; and the like.

Examples of the cycloalkyl group having 3 to 20 carbon atoms that is either substituted or unsubstituted include a cyclopropyl group, a cyclopentyl group, a cyclohexyl group, a cyclooctyl group, an adamantyl group, and the like. It is preferable that the cycloalkyl group include no heteroatom.

Examples of the aryl group having 6 to 12 carbon atoms that is either substituted or unsubstituted include a phenyl group, a 1-naphthyl group, a 2-naphthyl group, and the like. It is preferable that the aryl group include no heteroatom.

A substituent that may substitute the cycloalkyl group having 3 to 20 carbon atoms and the aryl group having 6 to 12 carbon atoms is not particularly limited, but is preferably without heteroatom. Examples of the substituent include alkyl groups having 1 to 12 carbon atoms, such as a methyl group and an ethyl group; halogen atoms such as a fluorine atom, a chlorine atom, and a bromine atom; alkoxy groups having 1 to 12 carbon atoms, such as a methoxy group, an ethoxy group, and an isopropoxy group; haloalkyl groups having 1 to 12 carbon atoms, such as a trifluoromethyl group; haloalkoxy groups having 1 to 12 carbon atoms, such as a trifluoromethoxy group; substituted or unsubstituted aryl groups having 6 to 12 carbon atoms, such as a phenyl group, a 4-methylphenyl group, a 2,4-dimethylphenyl group, a 2-chlorophenyl group, and a 3-methoxyphenyl group; an amino group; monosubstituted amino groups such as a methylamino group; disubstituted amino groups such as a dimethylamino group; an imino group; and the like.

Examples of the oxygen atom-containing polar group include a carboxyl group (hydroxycarbonyl group), a sulfonic acid group, a phosphoric acid group, a hydroxyl group, and the like.

Examples of the nitrogen atom-containing polar group include a cyano group, a primary amino group, a secondary amino group, a primary amide group, a secondary amide group (imide group), and the like.

Examples of the halogen atom-containing substituent include halogen atoms such as a fluorine atom, a chlorine atom, and a bromine atom; haloalkyl groups having 1 to 12 carbon atoms, such as a trifluoromethyl group and a pentafluoroethyl group; haloalkoxy groups having 1 to 12 carbon atoms, such as a trifluoromethoxy group; and the like.

Examples of the silicon atom-containing substituent include a trimethoxysilyl group, a triethoxysilyl group, a methyldimethoxysilyl group, and the like.

Specific examples of the norbornene-based monomer represented by the formula (3) include norbornenes that are unsubstituted, or substituted with an alkyl group, such as norbornene, 5-methylnorbornene, 5-ethylnorbornene, 5-butylnorbornene, 5-hexylnorbornene, 5-decylnorbornene, 5-cyclohexylnorbornene, and 5-cyclopentylnorbornene; norbornenes that are substituted with an alkenyl group, such as 5-ethylidenenorbornane, 5-vinylnorbornene, 5-propenylnorbornene, 5-cyclohexenylnorbornene, and 5-cyclopentenylnorbornene; norbornenes that are substituted with an aromatic group, such as 5-phenylnorbornene; norbornenes that include an oxygen atom-containing polar group, such as 5-methoxycarbonylnorbornene, 5-ethoxycarbonylnorbornene, 5-methyl-5-methoxycarbonylnorbornene, 5-methyl-5-ethoxycarbonylnorbornene; norbornenyl-2-methyl propionate, norbornenyl-2-methyl octanoate, norbornene-5,6-dicarboxylic anhydride, 5-hydroxymethylnorbornene, 5,6-di(hydroxymethyl)norbornene, 5,5-di(hydroxymethyl)norbornene, 5-hydroxy-i-propylnorbornene, 5,6-dicarboxynorbornene, and 5-methoxycarbonyl-6-carboxynorbornene; norbornenes that include a nitrogen atom-containing polar group, such as 5-cyanonorbornene and norbornene-5,6-dicarboxylic acid imide; tetracyclo[6.5.1$^{2,5}$.0$^{1,6}$.0$^{8,13}$]trideca-3,8,10,12-tetraene (also referred to as 1,4-methano-1,4,4a,9a-tetrahydrofluorene); tetracyclo[6.6.1$^{2,5}$.0$^{1,6}$.0$^{8,13}$]tetradeca-3,8,10,12-tetraene (also referred to as 1,4-methano-1,4,4a,5,10,10a-hexahydroanthracene); and the like.

Further, specific examples of the norbornene-based monomer represented by the formula (3) include tetracyclododecenes such as tetracyclododecene and tetracyclododecenes other than tetracyclododecene. Examples of tetracyclododecenes other than tetracyclododecene include tetracyclododecenes that are substituted with an alkyl group, such as 8-methyltetracyclododecene, 8-ethyltetracyclododecene, 8-cyclohexyltetracyclododecene, and 8-cyclopentyltetracyclododecene;

tetracyclododecenes that include a double bond outside the ring, such as 8-methylidenetetracyclododecene, 8-ethylidenetetracyclododecene, 8-vinyltetracyclododecene, 8-propenyltetracyclododecene, 8-cyclohexenyltetracyclododecene, and 8-cyclopentenyltetracyclododecene; tetracyclododecenes that include an aromatic ring, such as 8-phenyltetracyclododecene; tetracyclododecenes that are substituted with an oxygen atom-containing substituent, such as 8-methoxycarbonyltetracyclododecene, 8-methyl-8-methoxycarbonyltetracyclododecene, 8-hydroxymethyltetracyclododecene, 8-carboxytetracyclododecene, tetracyclododecene-8,9-dicarboxylic acid, and tetracyclododecene-8,9-dicarboxylic anhydride;

tetracyclododecenes that are substituted with a nitrogen atom-containing substituent, such as 8-cyanotetracyclododecene and tetracyclododecene-8,9-dicarboxylic acid imide; tetracyclododecenes that are substituted with a halogen atom-containing substituent, such as 8-chlorotetracyclododecene; tetracyclododecenes that are substituted with a silicon atom-containing substituent, such as 8-trimethoxysilyltetracyclododecene;

hexacycloheptadecenes that are unsubstituted, or substituted with an alkyl group, such as hexacycloheptadecene, 12-methylhexacycloheptadecene, 12-ethylhexacycloheptadecene, 12-cyclohexylhexacycloheptadecene, and cyclopentylhexacycloheptadecene; hexacycloheptadecenes that include a double bond outside the ring, such as 12-methylidynehexacycloheptadecene, 12-ethylidenehexacycloheptadecene, 12-vinylhexacycloheptadecene, 12-propenylhexacycloheptadecene, 12-cyclohexenylhexacycloheptadecene, and 12-cyclopentenylhexacycloheptadecene; hexacycloheptadecenes that are substituted with an aromatic ring, such as 12-phenylhexacycloheptadecene;

hexacycloheptadecenes that are substituted with an oxygen atom-containing substituent, such as 12-methoxycarbonylhexacycloheptadecene, 12-methyl-12-methoxycarbonylhexacycloheptadecene, 12-hydroxymethylhexacycloheptadecene, 12-carboxyhexacycloheptadecene, hexacycloheptadecene-12,13-dicarboxylic acid, and hexacycloheptadecene-12,13-dicarboxylic anhydride; hexacycloheptadecenes that are substituted with a nitrogen atom-containing substituent, such as 12-cyanohexacycloheptadecene and hexacycloheptadecene-12,13-dicarboxylic acid imide; hexacycloheptadecenes that are substituted with a halogen atom-containing substituent, such as 12-chlorohexacycloheptadecene; hexacycloheptadecenes that are substituted with a silicon atom-containing substituent, such as 12-trimethoxysilylhexacycloheptadecene; and the like.

These norbornene-based monomers may be used either alone or in combination.

The hydrogenated norbornene-based ring-opening polymer according to one embodiment of the invention may be produced by using a cycloolefin monomer having another structure in combination with the norbornene-based monomer as long as the resulting hydrogenated norbornene-based ring-opening polymer exhibits solvent resistance.

Examples of such a cycloolefin monomer include monocycloolefins such as cyclohexene, cycloheptene, and cyclooctene; cyclic dienes such as cyclohexadiene and cycloheptadiene; and the like.

These monomers may be used either alone or in combination.

The number average molecular weight (Mn) of the hydrogenated syndiotactic norbornene-based ring-opening polymer according to one embodiment of the invention is 500 to 1,000,000, preferably 1000 to 600,000, and more preferably 2000 to 400,000. If the number average molecular weight (Mn) of the hydrogenated syndiotactic norbornene-based ring-opening polymer is too low, the hydrogenated syndiotactic norbornene-based ring-opening polymer may exhibit low mechanical strength. If the number average molecular weight (Mn) of the hydrogenated syndiotactic norbornene-based ring-opening polymer is too high, it may be difficult to mold the hydrogenated syndiotactic norbornene-based ring-opening polymer. Note that the number average molecular weight (Mn) of the hydrogenated syndiotactic norbornene-based ring-opening polymer is almost equal to the number average molecular weight of the norbornene-based ring-opening polymer that is not hydrogenated.

When implementing the method for producing a hydrogenated syndiotactic norbornene-based ring-opening polymer according to one embodiment of the invention, the norbornene-based monomer is subjected to ring-opening polymerization using the polymerization catalyst that includes the Group 6 transition metal compound represented by the following formula (1).

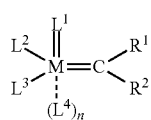

(1)

wherein M is an atom selected from the Group 6 transition metal atoms in the periodic table, $R^1$ and $R^2$ are independently a hydrogen atom or a group selected from a substituted or unsubstituted alkyl group having 1 to 12 carbon atoms, a substituted or unsubstituted cycloalkyl group having 3 to 20 carbon atoms, and a substituted or unsubstituted aryl group having 6 to 12 carbon atoms, $L^1$ is an oxygen atom, or a nitrogen atom that is unsubstituted, or substituted with a substituent selected from a substituted or unsubstituted alkyl group having 1 to 12 carbon atoms, a substituted or unsubstituted cycloalkyl group having 3 to 20 carbon atoms and a substituted or unsubstituted aryl group having 6 to 12 carbon atoms, $L^2$ and $L^3$ are independently a substituted or unsubstituted 5 to 15-membered conjugated heterocyclic group that includes at least one nitrogen atom, or a group represented by O—$R^3$, $R^3$ is a group selected from a substituted or unsubstituted alkyl group having 1 to 12 carbon atoms, a substituted or unsubstituted cycloalkyl group having 3 to 20 carbon atoms and a substituted or unsubstituted aryl group having 6 to 30 carbon atoms, $L^4$ is a phosphorus-containing compound, an oxygen-containing compound, or a nitrogen-containing compound, and n is 0 or 1.

The center metal (M in the formula (1)) of the Group 6 transition metal compound used as the component of the polymerization catalyst is an atom selected from the Group 6 transition metal atoms in the periodic table, and is preferably a tungsten (W) atom or a molybdenum (Mo) atom from the viewpoint of improving the activity of the polymerization catalyst.

The alkyl group having 1 to 12 carbon atoms (that is either substituted or unsubstituted) that may be represented by $R^1$ and $R^2$ may be linear, branched, or cyclic. Specific examples of the alkyl group having 1 to 12 carbon atoms include a methyl group, an ethyl group, a propyl group, an isopropyl group, a butyl group, a t-butyl group, a pentyl group, a hexyl group, and the like.

A substituent that may substitute the alkyl group having 1 to 12 carbon atoms is not particularly limited. Examples of the substituent include alkoxy groups having 1 to 12 carbon atoms, such as a methoxy group, an ethoxy group, and an isopropoxy group; haloalkyl groups having 1 to 12 carbon atoms, such as a trifluoromethyl group; haloalkoxy groups having 1 to 12 carbon atoms, such as a trifluoromethoxy group; substituted or unsubstituted aryl groups having 6 to 12 carbon atoms, such as a phenyl group, a 4-methylphenyl group, a 2,4-dimethylphenyl group, a 2-chlorophenyl group, and a 3-methoxyphenyl group; an amino group; monosubstituted amino groups such as a methylamino group; disubstituted amino groups such as a dimethylamino group; an imino group; and the like.

Examples of the cycloalkyl group having 3 to 20 carbon atoms that is either substituted or unsubstituted include a cyclopropyl group, a cyclopentyl group, a cyclohexyl group, a cyclooctyl group, an adamantyl group, and the like.

Examples of the aryl group having 6 to 12 carbon atoms that is either substituted or unsubstituted include a phenyl group, a 1-naphthyl group, a 2-naphthyl group, and the like.

A substituent that may substitute the cycloalkyl group having 3 to 20 carbon atoms and the aryl group having 6 to 12 carbon atoms is not particularly limited. Examples of the substituent include alkyl groups having 1 to 12 carbon atoms, such as a methyl group and an ethyl group; halogen atoms such as a fluorine atom, a chlorine atom, and a bromine atom; alkoxy groups having 1 to 12 carbon atoms, such as a methoxy group, an ethoxy group, and an isopropoxy group; haloalkyl groups having 1 to 12 carbon atoms, such as a trifluoromethyl group; haloalkoxy groups having 1 to 12 carbon atoms, such as a trifluoromethoxy group; substituted or unsubstituted aryl groups having 6 to 12 carbon atoms, such as a phenyl group, a 4-methylphenyl group, a 2,4-dimethylphenyl group, a 2-chlorophenyl group, and a 3-methoxyphenyl group; an amino group; monosubstituted amino groups such as a methylamino group; disubstituted amino groups such as a dimethylamino group; an imino group; and the like.

$L^1$ is an oxygen atom in the form of an oxo group (=O), or a nitrogen atom that is unsubstituted, or substituted with a substituent selected from a substituted or unsubstituted alkyl group having 1 to 12 carbon atoms, a substituted or unsubstituted cycloalkyl group having 3 to 20 carbon atoms, and a substituted or unsubstituted aryl group having 6 to 12 carbon atoms.

The alkyl group having 1 to 12 carbon atoms that may substitute the nitrogen atom that is either substituted or unsubstituted may be linear, branched, or cyclic. Specific examples of the alkyl group having 1 to 12 carbon atoms include a methyl group, an ethyl group, a propyl group, an isopropyl group, a butyl group, a t-butyl group, a pentyl group, and the like.

A substituent that may substitute the alkyl group having 1 to 12 carbon atoms is not particularly limited. Examples of the substituent include alkoxy groups having 1 to 12 carbon atoms, such as a methoxy group, an ethoxy group, and an isopropoxy group; haloalkyl groups having 1 to 12 carbon atoms, such as a trifluoromethyl group; haloalkoxy groups having 1 to 12 carbon atoms, such as a trifluoromethoxy group; substituted or unsubstituted aryl groups having 6 to 12 carbon atoms, such as a phenyl group, a 4-methylphenyl group, a 2,4-dimethylphenyl group, a 2-chlorophenyl group, and a 3-methoxyphenyl group; an amino group; monosubstituted amino groups such as a methylamino group; disubstituted amino groups such as a dimethylamino group; an imino group; and the like.

Examples of the cycloalkyl group having 3 to 20 carbon atoms that is either substituted or unsubstituted include a cyclohexyl group, an adamantyl group, and the like.

Examples of the aryl group having 6 to 12 carbon atoms that is either substituted or unsubstituted include a phenyl group, a 1-naphthyl group, a 2-naphthyl group, and the like.

A substituent that may substitute the cycloalkyl group having 3 to 20 carbon atoms and the aryl group having 6 to 12 carbon atoms is not particularly limited. Examples of the substituent include alkyl groups having 1 to 12 carbon atoms, such as a methyl group and an ethyl group; halogen atoms such as a fluorine atom, a chlorine atom, and a bromine atom; alkoxy groups having 1 to 12 carbon atoms, such as a methoxy group, an ethoxy group, and an isopropoxy group; haloalkyl groups having 1 to 12 carbon atoms, such as a trifluoromethyl group; haloalkoxy groups having 1 to 12 carbon atoms, such as a trifluoromethoxy group; substituted or unsubstituted aryl groups having 6 to 12 carbon atoms, such as a phenyl group, a 4-methylphenyl group, a 2,4-dimethylphenyl group, a 2-chlorophenyl group, and a 3-methoxyphenyl group; an amino group; monosubstituted amino groups such as a methylamino group; disubstituted amino groups such as a dimethylamino group; an imino group; and the like.

$L^2$ and $L^3$ are independently a substituted or unsubstituted 5 to 15-membered conjugated heterocyclic group that includes at least one nitrogen atom, or a group represented by $O-R^3$.

Examples of the conjugated heterocyclic group that may be represented by $L^2$ and $L^3$ include 5-membered conjugated heterocyclic groups such as a pyrrolyl group, an imidazolyl group, a pyrazolyl group, an oxazolyl group, and a thiazolyl group; 6-membered conjugated heterocyclic groups such as a pyridyl group, a pyridazinyl group, a pyrimidinyl group, a pyrazinyl group, and a triazinyl group; fused conjugated heterocyclic groups such as a quinazolinyl group, a phthalazinyl group, and a pyrrolopyridyl group; and the like.

A substituent that may substitute the conjugated heterocyclic group is not particularly limited. Examples of the substituent include alkyl groups having 1 to 12 carbon atoms, such as a methyl group and an ethyl group; halogen atoms such as a fluorine atom, a chlorine atom, and a bromine atom; alkoxy groups having 1 to 12 carbon atoms, such as a methoxy group, an ethoxy group, and an isopropoxy group; haloalkyl groups having 1 to 12 carbon atoms, such as a trifluoromethyl group; haloalkoxy groups having 1 to 12 carbon atoms, such as a trifluoromethoxy group; substituted or unsubstituted aryl groups having 6 to 12 carbon atoms, such as a phenyl group, a 4-methylphenyl group, a 2,4-dimethylphenyl group, a 2-chlorophenyl group, and a 3-methoxyphenyl group; an amino group; monosubstituted amino groups such as a methylamino group; disubstituted amino groups such as a dimethylamino group; an imino group; and the like.

$R^3$ in the group represented by $O-R^3$ is a group selected from a substituted or unsubstituted alkyl group having 1 to 12 carbon atoms, a substituted or unsubstituted cycloalkyl group having 3 to 20 carbon atoms and a substituted or unsubstituted aryl group having 6 to 30 carbon atoms.

Examples of the substituted or unsubstituted alkyl group having 1 to 12 carbon atoms that may be represented by $R^3$ include those mentioned above in connection with the substituted or unsubstituted alkyl group having 1 to 12 carbon atoms that may be represented by $R^1$ and $R^2$. Specific examples of the alkoxy group include a 1,1,1,3,3,3-hexafluorofluoro-2-propoxy group, a 2-methyl-2-propoxy group, a 1,1,1-trifluoro-2-methyl-2-propoxy group, a 1,1,1-trifluoro-2-trifluoromethyl-2-propoxy group, a 2-trifluoromethyl-2-phenyl-1,1,1-trifluoroethoxy group, and the like Specific examples of the substituted or unsubstituted aryl group having 6 to 30 carbon atoms that may be represented by $R^3$ include a 2,6-bis(2,4,6-trimethylphenyl)phenoxy group, a 2,6-bis(2,4,6-triisopropylphenyl)phenoxy group, a 2,4,6-trimethylphenoxy group, a 2,3,5,6-tetraphenylphenoxy group, and the like.

$L^4$ is a phosphorus-containing compound, an oxygen-containing compound, or a nitrogen-containing compound. More specifically, $L^4$ is a neutral ligand that includes a phosphorus atom, an oxygen atom, or a nitrogen atom.

Examples of $L^4$ include phosphorus-containing compounds such as a phosphine; oxygen-containing compounds such as a carbonyl, an ether, and an ester; and nitrogen-containing compounds such as an amine, a pyridine, a nitrile, and an isocyanide.

Specific compound examples of $L^4$ include trimethylphosphine, dimethylphenylphosphine, methyldiphenylphosphine, triphenylphosphine, tributylphosphine, and the like.

$L^4$ may be either a monodentate ligand or a bidentate ligand.

Examples of the bidentate ligand include a neutral conjugated heterocyclic ligand that includes at least two nitrogen atoms. Specific examples of the bidentate ligand include 2,2'-bipyridine, 4,4'-dimethylbipyridine, 2,2'-dimethylbipyridine, 2,2'-biquinoline, 1,10-phenanthroline, terpyridine, and the like.

n is 0 or 1.

Specific examples of the Group 6 transition metal compound represented by the formula (1) include compounds in which the center metal M is tungsten, such as
(2-trifluoromethyl-2-phenyl-1,1,1-trifluoroethoxy)2,6-dimethylphenylimidotungsten(VI)(2,5-dimethylpyrrolido)(neophylidene)(1,10-phenanthroline),
(2-trifluoromethyl-2-phenyl-1,1,1-trifluoroethoxy)phenylimidotungsten(VI)(2,5-dimethylpyrrolido)(neophylidene)(1,10-phenanthroline),
(2-trifluoromethyl-2-phenyl-1,1,1-trifluoroethoxy)2,6-dimethylphenylimidotungsten(VI)(2,5-dimethylpyrrolido)(neophylidene)(2,2'-bipyridine),
(2-trifluoromethyl-2-phenyl-1,1,1-trifluoroethoxy)phenylimidotungsten(VI)(2,5-dimethylpyrrolido)(neophylidene)(2,2'-bipyridine),
(2-trifluoromethyl-2-phenyl-1,1,1-trifluoroethoxy)2,6-dimethylphenylimidotungsten(VI)(2,5-dimethylpyrrolido)(neophylidene)(1,10-phenanthroline),
(2,3,5,6-tetraphenylphenoxy)oxotungten(VI)(2,5-dimethylpyrrolide)(neophylidene)(dim ethylphenylphosphine)

(2,6-bis(2,4,6-trimethylphenyl)phenoxy)oxotungten(VI)(2,
5-dimethylpyrrolide)(neophylidene) (dimethylphenyl-
phosphine)

(2,6-bis(2,4,6-trimethylphenyl)phenoxy)2,6-diisipropylphe-
nylimidotungten(VI)(2,5-dim ethylpyrrolide)(neo-
phylidene)(dimethylphenylphosphine)

compounds in which the center metal M is molybdenum, such as (2-trifluoromethyl-2-phenyl-1,1,1-trifluoroethoxy)2,6-dim-
ethylphenylimidomolybdenum(VI)(2,5-dimethylpyr-
rolido)(neophylidene)(1,10-phenanthroline), (2-trifluoromethyl-2-phenyl-1,1,1-trifluoroethoxy)phe-
nylimidomolybdenum(VI)(2,5-dimethylpyrrolido)(neo-
phylidene)(1,10-phenanthroline), (2-trifluoromethyl-2-phenyl-1,1,1-trifluoroethoxy)2,6-dim-
ethylphenylimidomolybdenum(VI)(2,5-dimethylpyr-
rolido)(neophylidene)(2,2'-bipyridine), and (2-trifluoromethyl-2-phenyl-1,1,1-trifluoroethoxy)phe-
nylimidomolybdenum(VI)(2,5-dimethylpyrrolido)(neo-
phylidene)(2,2'-bipyridine); and the like.

The Group 6 transition metal compound used as the polymerization catalyst includes the neutral conjugated heterocyclic ligand. Note that a metal salt compound may be used in combination with the Group 6 transition metal compound in order to increase the ring-opening polymerization rate of the norbornene-based monomer. The neutral conjugated heterocyclic ligand can be eliminated from the Group 6 transition metal compound to obtain a highly active catalyst species when the metal salt compound is used in combination with the Group 6 transition metal compound. Examples of a preferable metal atom that forms the metal salt include zinc, tin, copper, titanium, and a rare-earth metal. Specific examples of the metal salt include zinc chloride, copper chloride, tin chloride, titanium chloride, and the like.

The Group 6 transition metal compound represented by the formula (1) may be produced using the method disclosed in JP-T-2014-520103, for example. A commercially available product may be used as the Group 6 transition metal compound represented by the formula (1) either directly or after purification.

When implementing the method for producing a hydrogenated syndiotactic norbornene-based ring-opening polymer according to one embodiment of the invention, the norbornene-based monomer is subjected to ring-opening polymerization by mixing the norbornene-based monomer with the polymerization catalyst.

The amount of the polymerization catalyst relative to the norbornene-based monomer is not particularly limited. The polymerization catalyst is preferably used so that the molar ratio of the transition metal included in the Group 6 transition metal compound included in the polymerization catalyst to the norbornene-based monomer (transition metal included in Group 6 transition metal compound included in polymerization catalyst:norbornene-based monomer) is 1:10 to 1:2,000,000, more preferably 1:200 to 1:1,000,000, and particularly preferably 1:500 to 1:500,000. If the amount of the polymerization catalyst is too large, it may be difficult to remove the polymerization catalyst. If the amount of the polymerization catalyst is too small, sufficient polymerization activity may not be obtained.

The polymerization reaction may be performed in a solvent-free system. Note that it is preferable to perform the polymerization reaction in an organic solvent from the viewpoint of advantageously controlling the reaction. The organic solvent is not particularly limited as long as the organic solvent can dissolve or disperse the resulting ring-opening polymer, and does not adversely affect the polymerization reaction. Specific examples of the organic solvent that may be used include aliphatic hydrocarbons such as pentane, hexane, and heptane; alicyclic hydrocarbons such as cyclopentane, cyclohexane, methylcyclohexane, dimethylcyclohexane, trimethylcyclohexane, ethylcyclohexane, diethylcyclohexane, decahydronaphthalene, bicycloheptane, tricyclodecane, hexahydroindene, and cyclooctane; aromatic hydrocarbons such as benzene, toluene, and xylene; halogen-containing aliphatic hydrocarbons such as dichloromethane, chloroform, and 1,2-dichloroethane; halogen-containing aromatic hydrocarbons such as chlorobenzene and dichlorobenzene; nitrogen-containing hydrocarbons such as nitromethane, nitrobenzene, and acetonitrile; ethers such as diethyl ether and tetrahydrofuran; and aromatic ethers such as anisole and phenetole. Among these, aromatic hydrocarbons, aliphatic hydrocarbons, alicyclic hydrocarbons, ethers, and aromatic ethers are particularly preferable.

When performing the polymerization reaction in the organic solvent, the monomer concentration in the reaction system is not particularly limited, but is preferably 0.1 to 50 wt %, more preferably 0.5 to 45 wt %, and particularly preferably 1 to 40 wt %. If the monomer concentration is too low, productivity may decrease. If the monomer concentration is too high, the viscosity of the reaction solution may increase to a large extent after completion of the polymerization reaction, and it may be difficult to perform the subsequent hydrogenation reaction.

The polymerization temperature is not particularly limited, but is normally −50 to +200° C., and preferably −30 to 150° C., and particularly preferably 0 to 60° C. The polymerization time is not particularly limited, but is normally 1 minute to 100 hours.

When performing the polymerization reaction, a vinyl compound or a diene compound may be added to the polymerization system in order to adjust the molecular weight of the resulting norbornene-based ring-opening polymer.

The vinyl compound that may be added to the polymerization system in order to adjust the molecular weight of the norbornene-based ring-opening polymer is not particularly limited as long as the vinyl compound is an organic compound that includes a vinyl group. Examples of the vinyl compound include α-olefins such as 1-butene, 1-pentene, 1-hexene, and 1-octene; styrenes such as styrene and vinyltoluene; ethers such as ethyl vinyl ether, i-butyl vinyl ether, and allyl glycidyl ether; halogen-containing vinyl compounds such as allyl chloride; oxygen-containing vinyl compounds such as allyl acetate, allyl alcohol, and glycidyl methacrylate; nitrogen-containing vinyl compounds such as acrylamide; silicon-containing vinyl compounds such as vinyltrimethylsilane and vinyltrimethoxysilane; and the like.

The diene compound that may be added to the polymerization system in order to adjust the molecular weight of the norbornene-based ring-opening polymer is not particularly limited. Examples of the diene compounds include non-conjugated dienes such as 1,4-pentadiene, 1,4-hexadiene, 1,5-hexadiene, 1,6-heptadiene, 2-methyl-1,4-pentadiene, and 2,5-dimethyl-1,5-hexadiene; conjugated dienes such as 1,3-butadiene, 2-methyl-1,3-butadiene, 2,3-dimethyl-1,3-butadiene, 1,3-pentadiene, and 1,3-hexadiene; and the like.

The amount of the vinyl compound or the diene compound may be determined corresponding to the desired molecular weight. The vinyl compound or the diene compound is normally added in an amount of 0.1 to 10 mol % based on the monomer.

According to one embodiment of the invention, a norbornene-based ring-opening polymer having syndiotacticity can be obtained by subjecting the norbornene-based monomer to ring-opening polymerization under the above conditions using the polymerization catalyst that includes the Group 6 transition metal compound represented by the formula (1). Note that the expression "polymerization catalyst that includes a Group 6 transition metal compound" means that the polymerization catalyst includes a Group 6 transition metal compound as a polymerization active component.

Since the tacticity of the polymer does not change due to the hydrogenation reaction by performing the hydrogenation reaction as described below, a hydrogenated syndiotactic norbornene-based ring-opening polymer having high syndiotacticity can be obtained by subjecting the norbornene-based ring-opening polymer having high syndiotacticity to the hydrogenation reaction.

Note that the norbornene-based ring-opening polymer may be collected from the reaction mixture, and then subjected to the hydrogenation reaction, or the reaction mixture including the norbornene-based ring-opening polymer may be subjected directly to the hydrogenation reaction.

The number average molecular weight (Mn) (determined by $^1$H-NMR) of the norbornene-based ring-opening polymer subjected to the hydrogenation reaction is not particularly limited, but is preferably 1000 to 1,000,000, and more preferably 2000 to 800,000. A hydrogenated syndiotactic norbornene-based ring-opening polymer that exhibits moldability and heat resistance in a particularly well-balanced manner can be obtained by subjecting the norbornene-based ring-opening polymer having a number average molecular weight within the above range to the hydrogenation reaction. The number average molecular weight of the hydrogenated syndiotactic norbornene-based ring-opening polymer can be adjusted by adjusting the amount of the molecular weight modifier used during polymerization, and the like.

The method for producing a hydrogenated syndiotactic norbornene-based ring-opening polymer according to one embodiment of the invention includes adding a hydrogenation agent to the system including the norbornene-based ring-opening polymer obtained as described above, and heating the mixture, or adding a hydrogenation catalyst to the system including the norbornene-based ring-opening polymer, and adding hydrogen, to hydrogenate the carbon-carbon double bonds included in the norbornene-based ring-opening polymer to obtain a hydrogenated syndiotactic norbornene-based ring-opening polymer.

When implementing the method for producing a hydrogenated syndiotactic norbornene-based ring-opening polymer according to one embodiment of the invention, it is preferable to hydrogenate the carbon-carbon double bonds included in the norbornene-based ring-opening polymer using hydrazide-containing compound as hydrogenation reagent for transfer hydrogenation.

A compound that is used as the hydrogenation reagent for transfer hydrogenation is not particularly limited. A compound that is used as a hydrogenation reagent for a norbornene-based ring-opening polymer may be used as the hydrogenation catalyst. Specific examples of the hydrogenation reagent include hydrazine, p-toluenesulfonyl hydrazide, and the like.

When implementing the method for producing a hydrogenated syndiotactic norbornene-based ring-opening polymer according to one embodiment of the invention, it is preferable to hydrogenate the carbon-carbon double bonds included in the norbornene-based ring-opening polymer using the hydrogenation catalyst and hydrogen gas, which is called catalytic hydrogenation.

A compound that is used as the hydrogenation catalyst for catalytic hydrogenation is not particularly limited. A compound that is conventionally used as a hydrogenation catalyst may be used as a hydrogenation catalyst for the norbornene-based ring-opening polymer. Specific examples of the hydrogenation catalyst include $RuHCl(CO)(PPh_3)_3$, $RuHCl(CO)[P(p-Me-Ph)_3]_3$, $RuHCl(CO)(PCy_3)_2$, $RuHCl(CO)[P(n-Bu)_3]_3$, $RuHCl(CO)[P(i-Pr)_3]_2$, $RuH_2(CO)(PPh_3)_3$, $RuH_2(CO)[P(p-Me-Ph)_3]_3$, $RuH_2(CO)(PCy_3)_3$, $RuH_2(CO)[P(n-Bu)_3]_3 RuH(OCOCH_3)(CO)(PPh_3)_2$, $RuH(OCOPh)(CO)(PPh_3)_2$, $RuH(OCOPh-CH_3)(CO)(PPh_3)_2$, $RuH(OCOPh-OCH_3)(CO)(PPh_3)_2$, $RuH(OCOPh)(CO)(PCy_3)_2$, Raney nickel, nickel-diatomaceous earth, nickel acetate, and the like.

The hydrogenation reaction is normally performed in an inert organic solvent. Examples of the inert organic solvent that may be used for the hydrogenation reaction include aromatic hydrocarbons such as benzene, toluene, and xylene; aliphatic hydrocarbons such as pentane and hexane; alicyclic hydrocarbons such as cyclohexane and decahydronaphthalene; ethers such as tetrahydrofuran and ethylene glycol dimethyl ether; and the like.

The method for producing a hydrogenated syndiotactic norbornene-based ring-opening polymer according to one embodiment of the invention includes adding hydrogen to the system that includes the norbornene-based ring-opening polymer and the hydrogenation catalyst or adding the hydrogenation reagent to the system that includes the norbornene-based ring-opening polymer to hydrogenate the carbon-carbon double bonds included in the norbornene-based ring-opening polymer.

The hydrogenation reaction may be performed under different conditions corresponding to the hydrogenation catalyst. The reaction temperature (hydrogenation temperature) is normally −20 to +250° C., preferably −10 to +220° C., and more preferably 0 to +200° C. If the hydrogenation temperature is too low, the reaction rate may be too low. If the hydrogenation temperature is too high, side reactions may occur.

In the case of catalytic hydrogenation, the hydrogen pressure is normally 0.01 to 20 MPa, preferably 0.05 to 15 MPa, and more preferably 0.1 to 10 MPa. If the hydrogen pressure is too low, the hydrogenation rate may be too low. If the hydrogen pressure is too high, it may be necessary to use a pressure reactor (i.e., the reaction equipment is limited).

The reaction time is not particularly limited as long as the desired hydrogenation ratio can be achieved. The reaction time is normally 0.1 to 10 hours. After completion of the hydrogenation reaction, the target hydrogenated crystalline norbornene-based ring-opening polymer is collected using a normal method. The residual catalyst may be removed by filtration or the like.

The hydrogenation ratio of the norbornene-based ring-opening polymer achieved by the hydrogenation reaction (i.e., the ratio of main-chain double bonds that have been hydrogenated) is not particularly limited, but is preferably 98% or more, more preferably 99% or more, and particularly preferably 99.5% or more. The resulting hydrogenated syndiotactic norbornene-based ring-opening polymer exhibits better solvent resistance as the hydrogenation ratio increases.

The tacticity of the hydrogenated syndiotactic norbornene-based ring-opening polymer is not particularly limited as long as the hydrogenated syndiotactic norbornene-based ring-opening polymer has a syndiotacticity of more than 90%. The hydrogenated norbornene-based ring-opening polymer obtained using the production method according to one embodiment of the invention normally has high syndiotacticity. The hydrogenated syndiotactic norbornene-based ring-opening polymer may have a ratio of racemo diads in the norbornene-based monomer repeating units of more than 95%, or more than 99%.

The hydrogenated syndiotactic norbornene-based ring-opening polymer obtained by using the production method according to one embodiment of the invention exhibits high solvent resistance, and is rarely affected by an organic solvent.

Therefore, the hydrogenated syndiotactic norbornene-based ring-opening polymer according to one embodiment of the invention can suitably be used in various applications. The applications of a molded article (formed article) produced using the hydrogenated syndiotactic norbornene-based ring-opening polymer are not particularly limited. Examples of the applications of the molded article (formed article) include an optical reflector, an insulating material, an optical film, a connector, a food packaging material, a bottle, a pipe, a gear, fibers, a nonwoven fabric, and the like.

EXAMPLES

The invention is further described below by way of examples. Note that the invention is not limited to the following examples.

The following measurement methods and evaluation methods were used in the examples.

(1) Number Average Molecular Weight of Norbornene-Based Ring-Opening Polymer

The ratio of the number of hydrogen atoms present at the terminals of the polymer chain to the number of hydrogen atoms present in the polymer chain excluding the terminals was calculated based on the $^1$H-NMR measurement results, and the number average molecular weight of the syndiotactic norbornene ring-opening polymer was calculated based on the calculated ratio.

(2) Cis/Trans Content in Norbornene-Based Ring-Opening Polymer

The cis/trans content in the norbornene-based ring-opening polymer was calculated based on the $^1$H-NMR measurement results.

(3) Hydrogenation Ratio of Norbornene-Based Ring-Opening Polymer During Hydrogenation Reaction The hydrogenation ratio of the norbornene-based ring-opening polymer during the hydrogenation reaction was calculated based on the $^1$H-NMR measurement results.

(4) Ratio of Racemo Diads in Hydrogenated Syndiotactic Norbornene-Based Ring-Opening Polymer The hydrogenated syndiotactic norbornene-based ring-opening polymer was subjected to $^{13}$C-NMR measurement using chloroform-d or o-dichlorobenzene-d4/trichlorobenzene (½ wt/wt) as a solvent, and the ratio of racemo diads was determined based on the intensity ratio of the signal attributed to meso diads to the signal attributed to racemo diads.

(5) Ethanol Immersion Test Using Hydrogenated Syndiotactic Norbornene-Based Ring-Opening Polymer The hydrogenated syndiotactic norbornene-based ring-opening polymer was heat-compressed to have dimensions of 10×100×1 mm to prepare a sample. The sample was immersed in ethanol for 10 minutes, and the presence or absence of microcracks in the sample was evaluated. It was determined that the sample exhibited excellent solvent resistance when no microcracks were observed.

Synthesis Example 1 (Synthesis)

Synthesis of W[CHC(CH$_3$)$_2$Ph](PMe$_2$Ph)$_2$Cl$_2$(O) has been carried out according to literature procedures (D. V. Peryshkov, R. R. Schrock, *Organometallics* 2012, 31, 7278-7286.)

Synthesis of W[CHC(CH$_3$)$_2$Ph](PMe$_2$Ph)(2,3,5,6-Ph$_4$-C$_6$H$_1$O)(2,5-Me$_2$C$_4$H$_2$N)(O) ((2,3,5,6-tetraphenylphenoxy)oxotungten(VI)(2,5-dimethylpyrrolide)(neophylidene)(dimethylphenylphosphine)).

W[CHC(CH$_3$)$_2$Ph](PMe$_2$Ph)$_2$Cl$_2$(O) (340 mg, 0.5 mmol) and tetraphenylphenoxylithium.Et$_2$O (239 mg, 0.515 mmol) were stirred in benzene (13 mL) at RT for 20 hours and at 40° C. for 3 hours. A sample was taken, and analyzed by $^1$H NMR. The spectrum indicated complete conversion of W[CHC(CH$_3$)$_2$Ph](PMe$_2$Ph)$_2$Cl$_2$(O) into W[CHC(CH$_3$)$_2$Ph](PMe$_2$Ph)(2,3,5,6-Ph$_4$-C$_6$H$_2$O)Cl(O). LiMe$_2$Pyr (51 mg, 0.55 mmol) was added and the reaction mixture was stirred for 84 hours at room temperature. The LiCl was filtered off on a pad of Celite. The volatiles were evaporated in vacuum. Trituration of the residue with pentane yielded the spectroscopically pure product as a yellow powder. Yield: 389 mg (81%).

Example 1

A glass reactor equipped with a stirrer was charged with 0.1092 g of (2,3,5,6-tetraphenylphenoxy)oxotungsten(VI)(2,5-dimethylpyrrolide)(neophylidene)(di methylphenylphosphine) obtained in Synthesis Example 1, and 1 g of toluene. After the addition of 3.0 g of norbornene, 0.018 g of 1-octene and 75 g of dichloromethane, a polymerization reaction was performed at 20° C. The viscosity of the reaction mixture increased immediately after the initiation of the polymerization reaction. After 3 hours had elapsed, a large quantity of acetone was poured into the reaction mixture to aggregate the precipitate, and the aggregate was filtered off, washed, and dried at 40° C. for 24 hours under reduced pressure. The yield of the resulting ring-opening polymer was 2.1 g, and the ring-opening polymer had a number average molecular weight of 40,000 and a cis content of 99%. A glass reactor equipped with a stirrer was charged with 2.0 g of the resulting norbornene ring-opening polymer and 79 g of p-toluenesulfonylhydrazide. After the addition of 300 ml of p-xylene, a hydrogenation reaction was performed at 125° C. for 5 hours. The reaction mixture was poured into a large quantity of methanol to completely precipitate the resulting hydrogenated norbornene ring-opening polymer, which was filtered off, washed, and dried at 40° C. for 24 hours under reduced pressure. The hydrogenation ratio of the resulting hydrogenated ring-opening polymer was 99% or more, and the ratio of racemo diads in the hydrogenated ring-opening polymer was 100%. It was thus confirmed that a hydrogenated syndiotactic norbornene ring-opening polymer was produced. A sample prepared using the hydrogenated syndiotactic norbornene ring-opening polymer was subjected to the ethanol immersion test. The results are shown in Table 1.

Example 2

A glass reactor equipped with a stirrer was charged with 0.1092 g of (2,3,5,6-tetraphenylphenoxy)oxotungten(VI)(2,5-dimethylpyrrolide)(neophylidene)(dimethylphenyl phosphine) obtained in Synthesis Example 1, and 1 g of toluene. After the addition of 3.0 g of tetracyclododecene, 0.011 g of 1-octene and 75 g of dichloromethane, a polymerization reaction was performed at 20° C. The viscosity of the reaction mixture increased immediately after the initiation of the polymerization reaction. After 3 hours had elapsed, a large quantity of acetone was poured into the reaction mixture to aggregate the precipitate, and the aggregate was filtered off, washed, and dried at 40° C. for 24 hours under reduced pressure. The yield of the resulting ring-opening polymer was 2.76 g, and the ring-opening polymer had a number average molecular weight of 55,000 and a cis content of 99%. A glass reactor equipped with a stirrer was charged with 2.0 g of the resulting tetracyclododecene ring-opening polymer and 42 g of p-toluenesulfonylhydrazide. After the addition of 300 ml of p-xylene, a hydrogenation reaction was performed at 125° C. for 5 hours. The reaction mixture was poured into a large quantity of methanol to completely precipitate the resulting hydrogenated tetracyclododecene ring-opening polymer, which was filtered off, washed, and dried at 40° C. for 24 hours under reduced pressure. The hydrogenation ratio of the resulting hydrogenated ring-opening polymer was 99% or more, and the ratio of racemo diads in the hydrogenated ring-opening polymer was 100%. It was thus confirmed that a hydrogenated syndiotactic tetracyclododecene ring-opening polymer was produced. A sample prepared using the hydrogenated syndiotactic tetracyclododecene ring-opening polymer was subjected to the ethanol immersion test. The results are shown in Table 1.

Comparative Example 1

A glass reactor equipped with a stirrer was charged with 1.6 mg of triisobutylaluminum, 5.0 g of norbornene, 0.030 g of 1-octene and 150 g of dichloromethane. After the addition of 1.1 mg of tungsten hexachloride, a polymerization reaction was performed at 20° C. The viscosity of the reaction mixture increased immediately after the initiation of the polymerization reaction. After 3 hours had elapsed, a large quantity of acetone was poured into the reaction mixture to aggregate the precipitate, and the aggregate was filtered off, washed, and dried at 40° C. for 24 hours under reduced pressure. The yield of the resulting ring-opening polymer was 4.9 g, and the ring-opening polymer had a number average molecular weight of 62,000 and a cis content of 68%. A glass reactor equipped with a stirrer was charged with 2.0 g of the resulting norbornene ring-opening polymer and 79 g of p-toluenesulfonylhydrazide. After the addition of 300 ml of p-xylene, a hydrogenation reaction was performed at 125° C. for 5 hours. The reaction mixture was poured into a large quantity of methanol to completely precipitate the resulting hydrogenated norbornene ring-opening polymer, which was filtered off, washed, and dried at 40° C. for 24 hours under reduced pressure. The hydrogenation ratio of the resulting hydrogenated ring-opening polymer was 99% or more, and the ratio of racemo diads in the hydrogenated ring-opening polymer was 50%. It was thus confirmed that a hydrogenated atactic norbornene ring-opening polymer was produced. A sample prepared using the hydrogenated atactic norbornene ring-opening polymer was subjected to the ethanol immersion test. The results are shown in Table 1.

Comparative Example 2

A glass reactor equipped with a stirrer was charged with 7.3 mg of Et2Al(OEt), 3.0 g of tetracyclododecene, 0.11 g of 1-octene and 75 g of dichloromethane. After the addition of 9.7 mg of 2,6-dimethylphenylimido tungsten(VI) tetrachloride diethylether, a polymerization reaction was performed at 50° C. The viscosity of the reaction mixture increased immediately after the initiation of the polymerization reaction. After 3 hours had elapsed, a large quantity of acetone was poured into the reaction mixture to aggregate the precipitate, and the aggregate was filtered off, washed, and dried at 40° C. for 24 hours under reduced pressure. The yield of the resulting ring-opening polymer was 2.9 g, and the ring-opening polymer had a number average molecular weight of 18,000 and a cis content of 72%. A glass reactor equipped with a stirrer was charged with 2.0 g of the resulting tetracyclododecene ring-opening polymer and 42 g of p-toluenesulfonylhydrazide. After the addition of 300 ml of p-xylene, a hydrogenation reaction was performed at 125° C. for 5 hours. The reaction mixture was poured into a large quantity of methanol to completely precipitate the resulting hydrogenated tetracyclododecene ring-opening polymer, which was filtered off, washed, and dried at 40° C. for 24 hours under reduced pressure. The hydrogenation ratio of the resulting hydrogenated ring-opening polymer was 99% or more, and the ratio of racemo diads in the hydrogenated ring-opening polymer was 72%. It was thus confirmed that a hydrogenated atactic tetracyclododecene ring-opening polymer was produced. A sample prepared using the hydrogenated atactic tetracyclododecene ring-opening polymer was subjected to the ethanol immersion test. The results are shown in Table 1.

TABLE 1

| | Example | | Comparative Example | |
| --- | --- | --- | --- | --- |
| | 1 | 2 | 1 | 2 |
| Monomers | norbornene | tetracyclododecene | norbornene | tetracyclododecene |
| Molecular weight | 40,000 | 55,000 | 62,000 | 18,000 |
| Ratio (%) of racemo diads | 100 | 100 | 50 | 72 |
| Alcohol resistance test | Cracks did not occur | Cracks did not occur | Cracks occurred | Cracks occurred |

As is clear from Table 1, the hydrogenated syndiotactic norbornene ring-opening polymer and the hydrogenated syndiotactic tetracyclododecene ring-opening polymer according to the embodiments of the invention exhibited excellent solvent resistance (Example 1 and 2). On the other hand, the hydrogenated atactic norbornene and tetracyclododecene ring-opening polymer exhibited poor solvent resistance (Comparative Example 1 and 2). It was thus confirmed that the embodiments of the invention can provide a hydrogenated syndiotactic norbornene-based ring-opening polymer that exhibits excellent solvent resistance.

The invention claimed is:

1. A hydrogenated norbornene-based ring-opening polymer obtained by hydrogenating of carbon-carbon double bonds of a norbornene-based ring-opening polymer obtained by ring-opening polymerization of a norbornene monomer represented by the formula (3), having a syndiotacticity ((racemo diads)/(meso diads+racemo diads)×100) of more than 95%

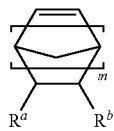
(3)

wherein m is 1 or 2, and $R^a$ and $R^b$ are independently selected from the group consisting of a hydrogen atom; a substituted alkyl group having 1 to 12 carbon atoms substituted with substituted or unsubstituted aryl groups having 6 to 12 carbon atoms, alkoxy groups having 1 to 12 carbon atoms, haloalkyl groups having 1 to 12 carbon atoms, haloalkoxy groups having 1 to 12 carbon atoms, an amino group, monosubstituted amino groups, disubstituted amino group and an imino group; an unsubstituted alkyl group having 1 to 12 carbon atoms; a substituted or unsubstituted cycloalkyl group having 3 to 20 carbon atoms; and a substituted or unsubstituted aryl group having 6 to 12 carbon atoms.

2. The hydrogenated norbornene-based ring-opening polymer according to claim 1, having a syndiotacticity ((racemo diads)/(meso diads+racemo diads)×100) of more than 99%.

* * * * *